UNITED STATES PATENT OFFICE.

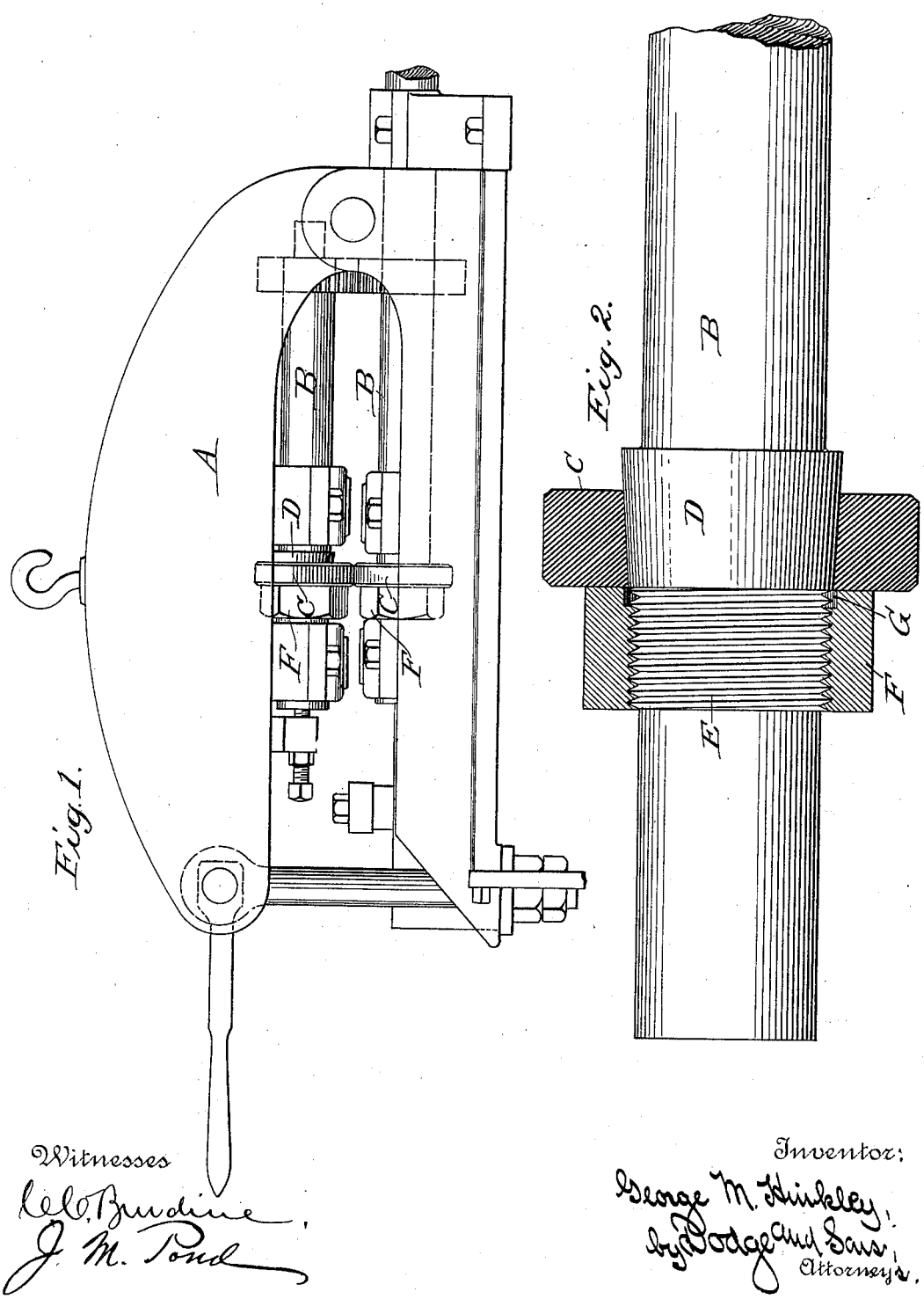

GEORGE M. HINKLEY, OF MILWAUKEE, WISCONSIN, ASSIGNOR OF ONE-HALF TO THE EDWARD P. ALLIS COMPANY, OF SAME PLACE.

ROLL FOR SAW-STRETCHING MACHINES.

SPECIFICATION forming part of Letters Patent No. 608,774, dated August 9, 1898.

Application filed June 17, 1897. Serial No. 641,176. (No model.)

*To all whom it may concern:*

Be it known that I, GEORGE M. HINKLEY, a citizen of the United States, residing at Milwaukee, in the county of Milwaukee and State of Wisconsin, have invented certain new and useful Improvements in Rolls for Saw-Stretching Machines, of which the following is a specification.

My present invention pertains to saw-stretching machines, and more particularly to the means employed for securing the rolls upon the shafts.

The invention is illustrated in the accompanying drawings, wherein—

Figure 1 is a side elevation of a portion of a saw-stretcher, showing the relation of the rolls; and Fig. 2, a side elevation, partly in section, of one of the shafts and the attached roll.

One object of my invention is to provide means whereby the roll may be securely held upon the shaft and at the same time permit its easy and ready removal when desired for any purpose, whether it be to replace, re-temper, or interchange it with the other roll.

Referring to the drawings, A denotes a portion of the frame of a saw-stretcher, and B the shafts mounted therein, carrying rolls C, between which the saw is passed in the usual manner. Suitable mechanism for driving the shafts will of course be employed, but is not shown, as it forms no part of the present invention. Shaft B is formed or provided with a conical enlargement or seat D, as shown in Fig. 2, and roll C is formed with an internal tapering bore designed to fit upon said seat, as shown. Immediately in front of seat D the shaft is provided with a threaded section E, upon which is screwed a nut or follower F, said nut being formed with an annular recess G of a diameter slightly greater than the smaller end of seat D, permitting it to slip over said end sufficiently to force the roll tightly upon the seat.

If the internal bore of the roller be such that its face does not coincide exactly with the smaller end of cone D, nut F may be screwed up sufficiently to insure the roll seating properly. It is absolutely essential to the proper operation of the machine that the roll be held fast upon its seat. With this construction the roll may be readily removed at any time and put back or replaced at will with the assurance that it will come to its proper position and be securely held.

Having thus described my invention, what I claim is—

In combination with a shaft formed with a frusto-conical seat; a roll provided with a taper-bore designed to fit thereon; a threaded section on the shaft contiguous to the smaller end of the conical seat; and a nut formed with a recess as G in its side face designed to be screwed upon the shaft and to bear against the roller, substantially as and for the purpose described.

In witness whereof I hereunto set my hand in the presence of two witnesses.

GEORGE M. HINKLEY.

Witnesses:
 FRANK W. GREENLEAF,
 HARRY A. DUCAT.